(12) United States Patent
Kondoh et al.

(10) Patent No.: US 8,489,273 B2
(45) Date of Patent: Jul. 16, 2013

(54) ELECTRIC CONTROL UNIT

(75) Inventors: Masayoshi Kondoh, Chiryu (JP); Minoru Hozuka, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/473,911

(22) Filed: May 17, 2012

(65) Prior Publication Data
US 2012/0296544 A1 Nov. 22, 2012

(30) Foreign Application Priority Data
May 20, 2011 (JP) .................................. 2011-113654

(51) Int. Cl.
*G01M 17/00* (2006.01)
*G06F 7/00* (2006.01)
*G06F 19/00* (2011.01)

(52) U.S. Cl.
USPC ............................................. 701/33.4; 701/99

(58) Field of Classification Search
USPC .................. 701/99, 33.4, 3, 22, 123, 36, 102, 701/29.3, 29.1, 31.9
See application file for complete search history.

(56) References Cited

U.S. PATENT DOCUMENTS

| | | | | |
|---|---|---|---|---|
| 4,525,782 A * | 6/1985 | Wohlfarth et al. | ............... | 701/99 |
| 6,049,755 A * | 4/2000 | Lou et al. | .................... | 701/455 |
| 6,609,051 B2 * | 8/2003 | Fiechter et al. | ............... | 701/29.3 |
| 6,710,774 B1 * | 3/2004 | Kawasaki et al. | ............. | 345/419 |
| 7,079,927 B1 * | 7/2006 | Tano et al. | .................... | 701/29.6 |
| 8,078,641 B2 * | 12/2011 | Mao et al. | ...................... | 707/796 |
| 8,255,110 B2 * | 8/2012 | Taguchi | ......................... | 701/29.1 |
| 8,306,782 B2 * | 11/2012 | Idemori et al. | ................ | 702/185 |
| 2009/0187333 A1 * | 7/2009 | Mueller | ........................ | 701/200 |
| 2011/0106439 A1 * | 5/2011 | Huang et al. | .................. | 701/208 |
| 2011/0302532 A1 * | 12/2011 | Missig | .......................... | 715/823 |
| 2012/0192117 A1 * | 7/2012 | Migos et al. | .................. | 715/863 |
| 2012/0209450 A1 * | 8/2012 | Nagai et al. | ........................ | 701/1 |
| 2012/0296544 A1 * | 11/2012 | Kondoh et al. | ................. | 701/99 |
| 2012/0310474 A1 * | 12/2012 | Sakakibara | .................. | 701/33.4 |

FOREIGN PATENT DOCUMENTS
WO WO 2008/038374 4/2008

OTHER PUBLICATIONS
U.S. Appl. No. 13/372,658, Nagai et al., filed Feb. 14, 2012.

* cited by examiner

*Primary Examiner* — Thomas Black
*Assistant Examiner* — Robert Payne
(74) *Attorney, Agent, or Firm* — Nixon & Vanderhye PC

(57) ABSTRACT

An electric control unit may include a behavior check unit, a drive information store unit, a classify unit, a count unit and a condition set unit. The behavior check unit determines whether a vehicle behavior is generated by comparing the vehicle behavior with a detection condition. The drive information store unit stores information of the vehicle behavior in a memory unit drive when the vehicle behavior is generated. The classify unit classifies the vehicle behavior into one of a plurality of behavior classes. The behavior classes are arranged to classify the vehicle behavior according to a magnitude of the vehicle behavior. The count unit controls a counter for each behavior class according to the classification of the vehicle behavior. Based on the counters of each of the behavior classes, the condition set unit sets the detection condition as a boundary condition of one of the behavior classes.

8 Claims, 8 Drawing Sheets

| 3000LESS CNTR | 4000LESS CNTR | 5000LESS CNTR |
|---|---|---|
| 6 | 3 | 0 |

| 3000LESS CNTR | 4000LESS CNTR | 5000LESS CNTR |
|---|---|---|
| 3 | 3 | 0 |

ELECTRIC CONTROL UNIT

CROSS REFERENCE TO RELATED APPLICATION

The present application is based on and claims the benefit of priority of Japanese Patent Application No. 2011-113654, filed on May 20, 2011, the disclosure of which is incorporated herein by reference.

TECHNICAL FIELD

The present disclosure generally relates to an electric control unit which stores drive information of a vehicle for an analysis of vehicle behaviors.

BACKGROUND

Conventionally, a drive operation pattern or tendency of a driver may be classified into several classes. Such classification is disclosed, for example, in international publication (WO) 2008/038374 ('374). The disclosure of '374 provides a classification technique of a driver's drive operation tendency and vehicle behavior patterns based on sensor-detected speed, acceleration, road noises, and the like, in terms of roughness of driving, in association with acceleration, braking, passing through rough surface roads, and the like.

Further, abnormalities of sensors and/or actuators have been detected based on diagnosis codes corresponding to such abnormalities and based on time-lapse sensor outputs and control data at the time of occurrence of such abnormalities, which are recorded as drive information.

According to '374, the drive operation and the vehicle behavior used for classification and categorization are generated as a result of and corresponding to a driver's operation. Further, the diagnosis code and the drive information at the time of diagnosis are stored when a sensor abnormality is detected.

Therefore, when the vehicle behavior is generated in a manner not corresponding to a drive operation at a time of no sensor abnormality, such vehicle behavior will not be detected, therefore the corresponding drive information is not stored. As a result, even when a vehicle behavior that does not correspond to the driver's drive operation is generated, cause of such non-corresponding vehicle behavior is not able to be analyzed based on the drive information.

SUMMARY

In view of the above and other problems, the present disclosure provides an electric control unit that stores drive information at a time of condition-satisfying vehicle behavior without over-storing unnecessary drive information based on an observed tendency of vehicle behaviors.

The applicant of the present application examined, when a predetermined detection condition for detecting a non-corresponding vehicle behavior that does not correspond to the driver's driving operation is set in advance, whether a technique that compares such detection condition with an actual vehicle behavior and stores in a memory unit the drive information of the vehicle behavior satisfying such detection condition is beneficial for the analysis of the cause of such unexpected vehicle behavior based on the stored drive information.

However, in the course of examination, the applicant has noticed that, when the detection condition to be compared with the vehicle behavior is fixedly set, an expected vehicle behavior corresponding to the driving operation of the driver may occasionally satisfy the detection condition for detecting a non-corresponding vehicle behavior. Further, the applicant has noticed that, if such vehicle behavior corresponding to the driver's driving operation is frequently detected based on the fixedly-set detection condition, such vehicle behavior may be over-stored in the memory unit, thereby, due to the limited amount of storage of the memory unit, overwriting the drive information at the time of the non-corresponding vehicle behavior and preventing the analysis of the cause of the unexpected vehicle behavior.

Therefore, according to the present disclosure, the electric control unit, in an aspect, includes: a behavior check unit that determines whether a "condition-satisfying" vehicle behavior is generated by comparing the vehicle behavior with the detection condition, and a drive information store unit that stores drive information of the vehicle behavior in a memory unit when the behavior check unit determines that the condition satisfying vehicle behavior is generated.

Further, based on a plurality of predetermined behavior classes for classifying the vehicle behavior according to a magnitude of the vehicle behavior, a classify unit classifies the vehicle behavior into one of the behavior classes. In addition, a count unit controls a counter for each of the plurality of behavior classes according to classification of the vehicle behavior by the classify unit, and a condition set unit sets the detection condition as a boundary condition of one of the plurality of behavior classes based on the counter of each of the plurality of behavior classes.

In such manner, based on the counter for respective behavior classes and according to the magnitude of the vehicle behavior, a frequently-generated vehicle behavior may, for example, be analyzed and determined as caused by the tendency of driving operation of a driver.

Therefore, based on the counter for respective behavior classes, by an appropriate adjustment of the detection condition, the frequently-generated vehicle behavior may be rendered not to satisfy the detection condition any more, thereby preventing the storage of the drive information of such frequently-generated vehicle behavior and thereby allowing the storage of the drive information at a time of generation of unexpected vehicle behaviors. As a result, when the unexpected vehicle behavior is generated, cause of generation of such behavior is analyzed based on the drive information stored in the memory unit.

In addition to the above configuration, the condition set unit sets the detection condition as a boundary condition between a base behavior class that has an over-threshold count of the vehicle behavior and a higher limit behavior class that is a more difficult to reach behavior class next to the base behavior class.

In such manner, even when a certain vehicle behavior is frequently detected corresponding to the driver's driving operation, such vehicle behavior will no more satisfy the detection condition when the counter of frequently-detected vehicle behavior exceeds a threshold and the detection condition is accordingly shifted to a harder, more difficult (i.e., less easily generable behavior class) side. Therefore, even when a certain vehicle behavior is frequently generated corresponding to the driver's driving operation, the drive information regarding such vehicle behavior corresponding to the driver's driving operation is prevented from being stored in the memory unit.

In addition to the above configuration, the count unit may store the counter of each behavior class in a rewritable memory unit that keeps memory data while a vehicle driving operation is stopped.

In such manner, when the vehicle driving operation is resumed after the stopping, the detection condition to be compared with the vehicle behavior is set based on the accumulated count from the previous operations. Thus, for example, the tendency of the vehicle behavior of the same driver is continuously counted and observed.

In addition to the above configuration, the count unit may store the counter of each behavior class in the memory unit that discards memory data when the vehicle operation is stopped.

In such manner, when the vehicle operation is resumed after a stop of the vehicle operation, the counter stored in the previous vehicle operation is discarded, that is, the counter of all behavior classes are initialized. Accordingly, the stored tendency of the vehicle behavior in association with one driver is erased when the vehicle operation is stopped, thereby preventing the drive operation tendency of one drive from mixing with the tendency of other drivers. That is, the drive operation tendency is separately measured for each cycle of vehicle operation and for each of the drivers.

BRIEF DESCRIPTION OF THE DRAWINGS

Other objects, features and advantages of the present invention will become more apparent from the following detailed description disposed with reference to the accompanying drawings, in which.

DETAILED DESCRIPTION

Figure 1:
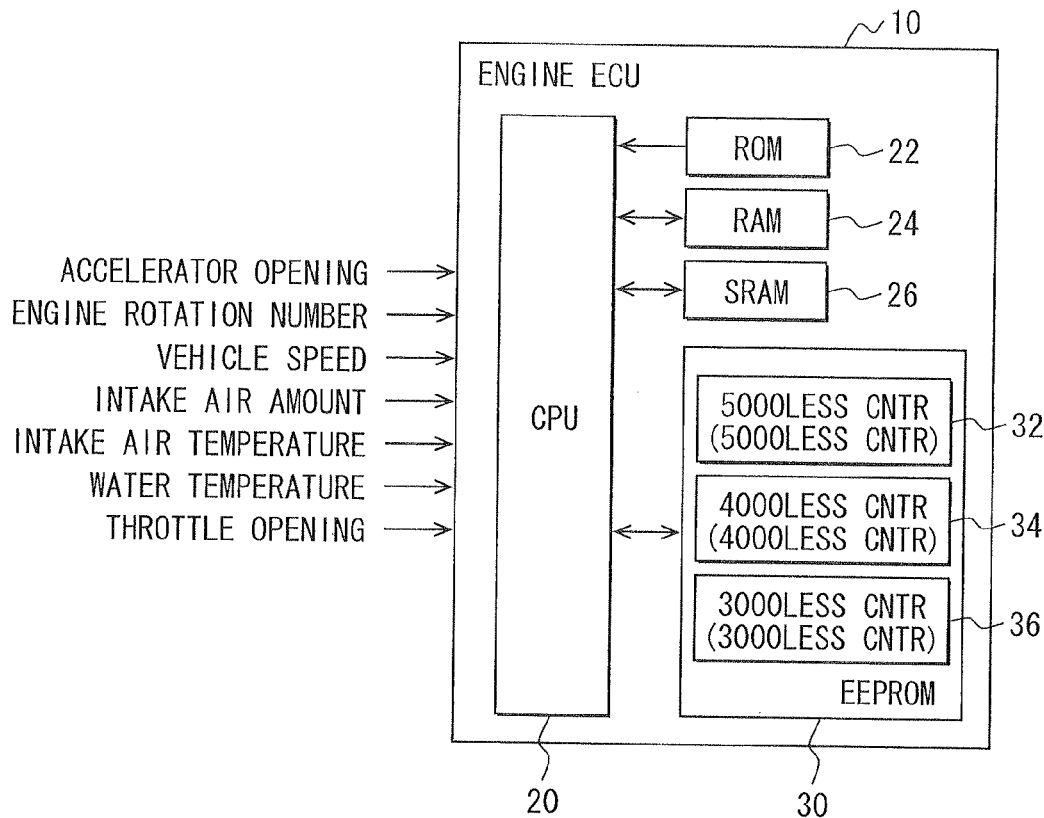
FIG. 1 is a block diagram of an electric control unit in of the present disclosure.

The embodiments of the present disclosure are described in the following based on the drawings. With reference to FIG. 1, an electric control unit (ECU) 10 for controlling an engine in the present embodiment includes a CPU 20, a ROM 22, a RAM 24, a SRAM (i.e., standby RAM) 26, an EEPROM 30, and an input and output circuit (not illustrated).

ECU 10 receives inputs of various detection signals representative of an accelerator opening, an engine rotation number, a vehicle speed, an intake air amount, an intake air temperature, water temperature, a throttle opening, and the like through an input circuit based on an execution of a stored control program in ROM 22 by CPU 20. Based on the detection signals received, ECU 10 performs drive control of an engine, such as a fuel injection control of an injector, and ignition control of spark plugs.

Unlike RAM 24 that loses memory data once a power supply from the battery is intercepted, which is used as a work memory by the control program of ECU 10, SRAM 26 always receives a power supply from the battery even when the operation of the vehicle is stopped. Therefore, the data stored in SRAM 26 is saved unless the power supply is intercepted due to a replacement of the battery or the like.

EEPROM 30 is a non-volatile memory unit that is rewritable. Even when a power supply from the battery is stopped, the data stored in EEPROM 30 is kept unchanged. In EEPROM 30, a less-than-5000 rpm class counter 32, a less-than-4000 rpm class counter 34, and a less-than-3000 rpm class counter 36 are provided. Each of these counters is used to count the tendency of the engine rotation number in an accelerator opening all-shut state.

In the following, functions of the ECU 10 implemented by the control program stored in ROM 22 and executed by CPU 20 are described.

(Behavior Check Unit)

By comparing a detection condition with a vehicle behavior, ECU 10 detects and determines whether unexpected vehicle behavior, which does not correspond to a driver's driving operation and satisfies the detection condition is generated. In the present embodiment, the engine rotation number in an accelerator opening all-shut state is designated as a vehicle behavior, and a range of the engine rotation number is considered as a detection condition. Therefore, ECU 10 determines whether a detected engine rotation number in an accelerator opening all-shut state satisfies, or falls within, a certain range of engine rotation number that serves as the detection condition.

Specifically, when a driver of a vehicle turns off the accelerator, or in other words releases an accelerator pedal, which is designated as an accelerator opening all-shut state, the engine rotation number should decrease according to the shutting (or closing) of the accelerator by the driver. Therefore, ECU 10 may determine that the engine rotation number has risen to an unexpected number of rotations without corresponding to the driver's driving operation of releasing the accelerator pedal, which puts the accelerator in an all-shut state, by comparing the detected engine rotation number in an accelerator opening all-shut state with the detection condition that is provided as predetermined engine rotation number(s) (i.e. a range of engine rotation numbers).

(Drive Information Store Unit)

When the detected engine rotation number reaches the predetermined engine rotation number in an accelerator opening all-shut state to satisfy the detection condition, an unexpected vehicle behavior is detected. Accordingly, when the unexpected vehicle behavior is detected, ECU 10 stores the accelerator opening, the detected engine rotation number, the vehicle speed, the intake air amount, the temperature of intake air, the water temperature, and the throttle opening mentioned above in EEPROM 30 as the drive information. In such manner, a cause of the unexpected vehicle behavior, that is, the unexpected number of engine rotation in an accelerator opening all-shut state, is analyzed based on the drive information stored in EEPROM 30.

When the vehicle is equipped with an in-vehicle camera and a navigation system, additional information from the camera and the navigation system in addition to the drive information may be stored as the drive information. The additional information may include surrounding vehicle travel conditions based on an analysis result of captured images from the in-vehicle camera, shapes of a traveling road, such as a road curvature, road inclinations, and the like based on map data information.

(Classify Unit)

In the present embodiment, the engine rotation number in an accelerator opening all-shut state is classified into one of three classes: class 1 having a rotation number range of equal to or greater than 4000 rpm and smaller than 5000 rpm, class 2 having a rotation number range of equal to or greater than 3000 rpm and smaller than 4000 rpm, and class 3 having a rotation number range of smaller than 3000 rpm. In other words, according to the engine rotation number in an accelerator opening all-shut state, the vehicle behavior is classified into multiple (e.g., three) classes.

Since a class-determining engine rotation number range decreases as the class number increases from class 1 to class 3, such range becomes more reachable as the class number increases. Based on the above definition of the engine rotation numbers for class 1 to class 3, ECU 10 determines which class the engine rotation number in an accelerator opening all-shut state falls in from among class 1 to class 3.

(Count Unit)

The less-than-5000 rpm class counter 32, the less-than-4000 rpm class counter 34, and the less-than-3000 rpm class counter 36 mentioned above are respectively provided for class 1, class 2, and class 3 of engine rotation numbers in an accelerator opening all-shut state. The "less-than-5000 rpm class counter" may be provided as "5000LESS CNTR" in the drawings, the "less-than-4000 rpm class counter" may be provided as the "4000LESS CNTR" in drawings, and the "less-than-3000 rpm class counter" may be provided as the "3000LESS CNTR" in drawings When the engine rotation number in an accelerator opening all-shut state falls in one of class 1 to class 3, a first condition set process increments the counter of the corresponding class and the counter of a lower limit class(es), where the lower limit class(es) have a lower engine rotation number range in comparison to the class actually corresponding to the engine rotation number. The lower limit class may be referred to as a more-easily-reachable class. Alternatively, in a second condition set process, the counter of only one class, that is, the counter of the corresponding class may be incremented.

(Condition Set Unit)

When one of the counters 32, 34, 36 exceeds a predetermined number (i.e., a threshold), ECU 10 determines that the engine rotation number of such over-threshold count class is caused by an over-use of engine brakes by the driver. In other words, during a drive operation of the vehicle, ECU 10 continuously/repeatedly sets the detection condition to be compared with the engine rotation number in an accelerator opening all-shut state, which determines whether an unexpected vehicle behavior is generated (i.e., the unexpected-in-all-shut-state detection condition). ECU 10 sets the detection condition as a boundary condition between two classes, that is, a boundary of rotation number between the over-threshold count class and a higher limit class (i.e. a more difficult to reach class), whose range of engine rotation number is higher than the over-threshold count class.

When the less-than-5000 rpm class counter 32 exceeds a predetermined number, the detection condition to be compared with the engine rotation number in an accelerator opening all-shut state is set to be equal or to greater than 5000 rpm. When the less-than-4000 rpm class counter 34 exceeds a predetermined number, the detection condition to be compared with the engine rotation number in an accelerator opening all-shut state is set to be equal to or greater than 4000 rpm. When the less-than-3000 rpm class counter 36 exceeds a predetermined number, the detection condition to be compared with the engine rotation number in an accelerator opening all-shut state is set to be equal to or greater than 3000 rpm. In such case, the engine rotation number of equal to or greater than 5000 rpm is a class with no counter.

In the following, a first drive information store process for determining whether an unexpected vehicle behavior is generated is described with reference to FIG. 2. A first condition set process for setting and changing the detection condition (i.e., the unexpected-in-all-shut-state detection condition for detecting a certain vehicle behavior) is described with reference to FIG. 3. Specifically, the detection condition set in FIG. 3 is compared with a detected engine rotation number in an accelerator opening all-shut state during a drive operation of the vehicle in the process of FIG. 2, to determine if an unexpected vehicle behavior was generated. In addition, an initialization process for setting the detection condition at a time of starting the ECU operation (i.e., initialization) is described with reference to FIG. 5. In the following, 'S' in the flowcharts means a step.

(First Drive Information Store Process)

Figure 2:
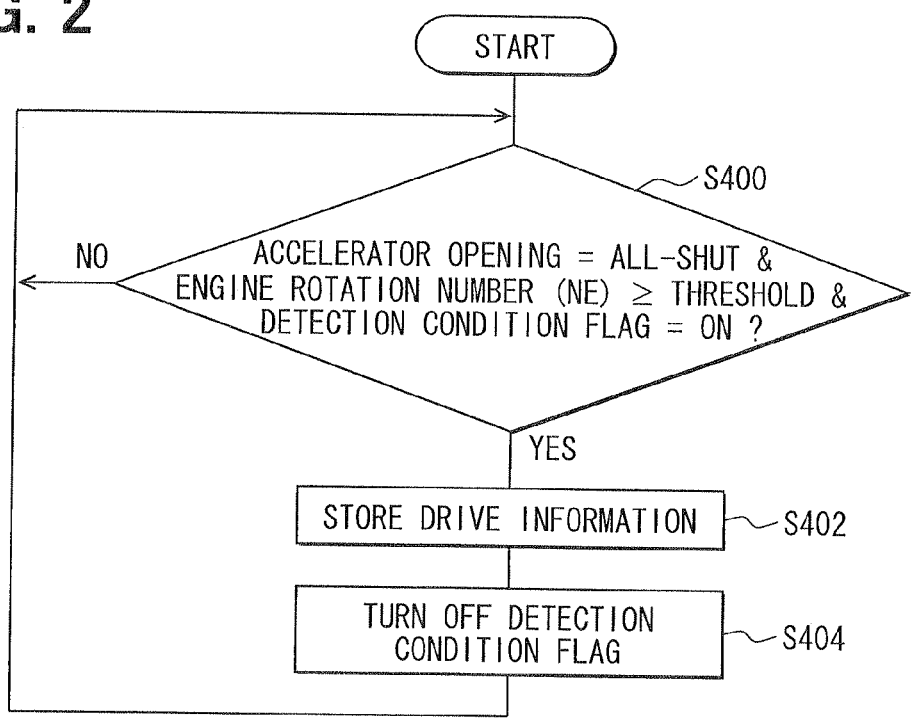
FIG. 2 is a flowchart of a first drive information memory process based on the engine rotation number of the present disclosure.
Figure 3:
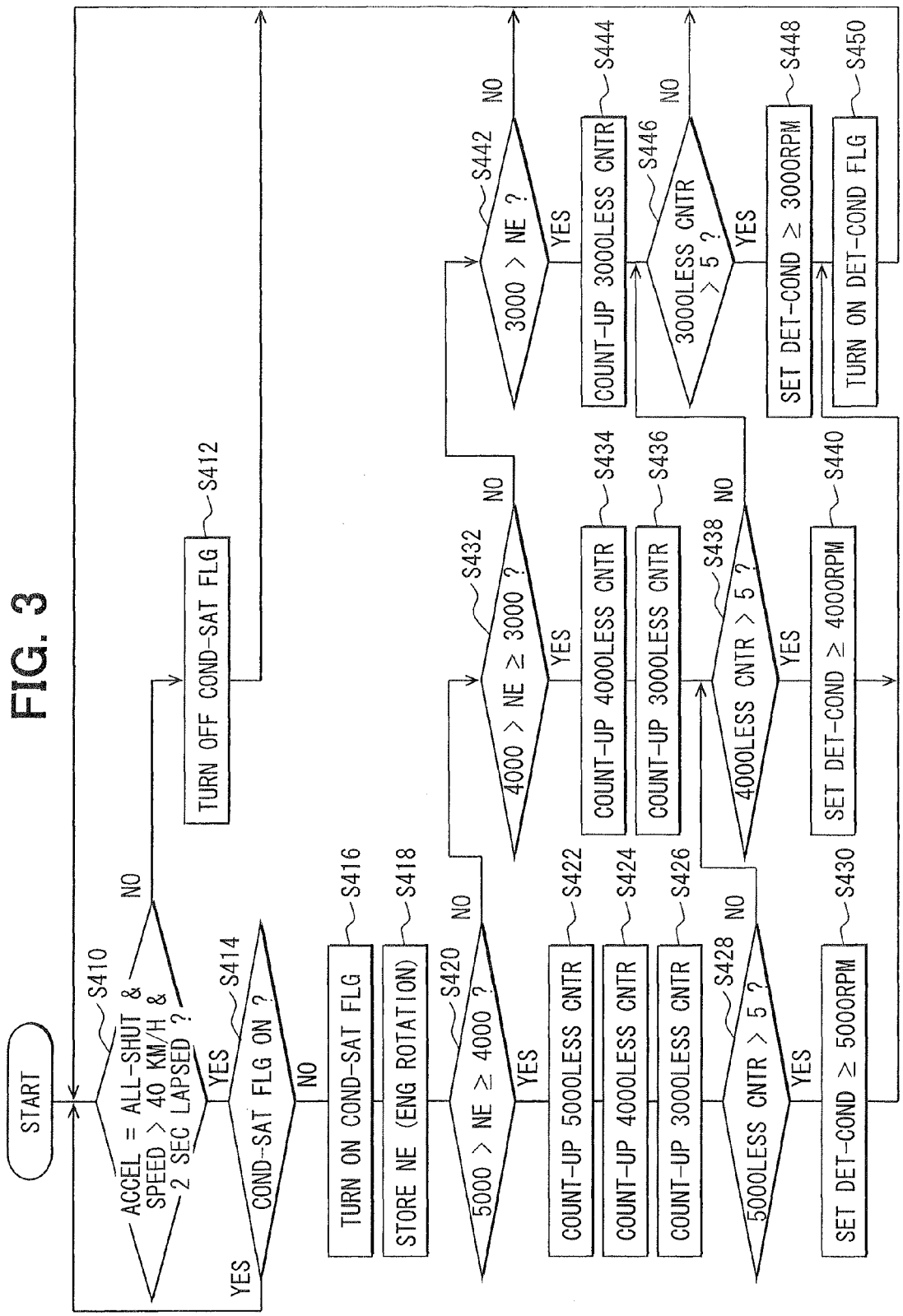
FIG. 3 is a flowchart a first condition set process based on the engine rotation number of the present disclosure.

FIG. 2 is a flowchart of the first drive information store process for storing the drive information when the detected engine rotation number in an accelerator opening all-shut state satisfies a preset engine rotation threshold (i.e., threshold in drawings), which may be provided as a range of engine rotation numbers or a single engine rotation value. The first drive information store process is continuously performed.

ECU 10, in S400, determines whether an accelerator opening is in the all-shut state, and whether a detected engine rotation number (NE in FIGs) is equal to or greater than the preset engine rotation threshold, and whether a detection condition flag is turned. An initial value of the preset engine rotation threshold may be set to, for example, 2000 rpm. Further, the detection condition flag is initially set to on.

When the accelerator opening is not in the all-shut state, when the detected engine rotation number is not greater than the preset engine rotation threshold, or when the detection condition flag is turned off (S400:No), ECU 10 returns to S400.

When the accelerator opening is in the all-shut state, when the detected engine rotation number is greater than the preset engine rotation threshold, and when the detection condition flag is turned on (S400:Yes), ECU 10 retrieves the drive information, such as an accelerator opening, the detected engine rotation number, a vehicle speed, an intake air amount, temperature of the intake air, water temperature, and a throttle opening, and stores such information in EEPROM 30 (S402). ECU 10 then turns off the detection condition flag (S404), and returns to S400. Therefore, the process for storing the drive information in S402 is not performed until the detection condition flag is subsequently turned on, even when the accelerator opening is in the all-shut state and the detected engine rotation number exceeds the preset engine rotation threshold.

(First Condition Set Process)

FIG. 3 is a flowchart of the first condition set process for setting the detection condition. The detection condition may be provided as a range of engine rotation numbers to be compared with a detected engine rotation number in an accelerator opening all-shut state in S400 of FIG. 2. In other words the detection condition provided as a predetermined engine rotation range is used as the preset engine rotation threshold in S400 of FIG. 2. The detection condition is based on the tendency of the engine rotation number at a time of use of engine brakes in an accelerator opening all-shut state by a driver of the vehicle. The first condition set process is continuously performed.

ECU 10 determines whether a state that the vehicle speed exceeds 40 km/h in an accelerator opening all-shut state is kept for 2 seconds or longer (S410). When the accelerator opening is not in an all-shut state, when the vehicle speed is less than 40 km/h, or when the state that vehicle speed exceeds 40 km/h has not yet been kept for 2 seconds (S410:No), ECU 10 turns off the condition satisfy flag (S412), and ECU 10 returns process to S410.

The initial value of the condition satisfy flag is "off." The condition satisfy flag shows that a condition of S410 is not satisfied if the flag is turned "off," and shows that the conditions of S410 are satisfied if the flag is turned "on."

The condition regarding whether the vehicle speed is over-40 km/h for 2 seconds or more prevents a false determination of a detection condition. Specifically, if the 2 second condition is not included in the detection condition, other conditions of S410 (i.e., the vehicle speed exceeding 40 km/h in an accelerator opening all-shut state) are already satisfied when engine brakes are used and the engine rotation number is increased just after applying the engine brakes. As a result, since a somewhat "high" engine rotation number and an accelerator opening all-shut state are observed, and, without 2 second condition, such a situation is falsely determined as the unexpected vehicle behavior, and leads to storage of the engine rotation number as the drive information, thereby falsely contributing to the engine rotation number (i.e., vehicle behavior) tendency determination. Therefore, by incorporating the two second condition in the detection condition, a false determination based on the tendency of the engine rotation number to increase after the use of an engine brake is prevented.

Figure 4:
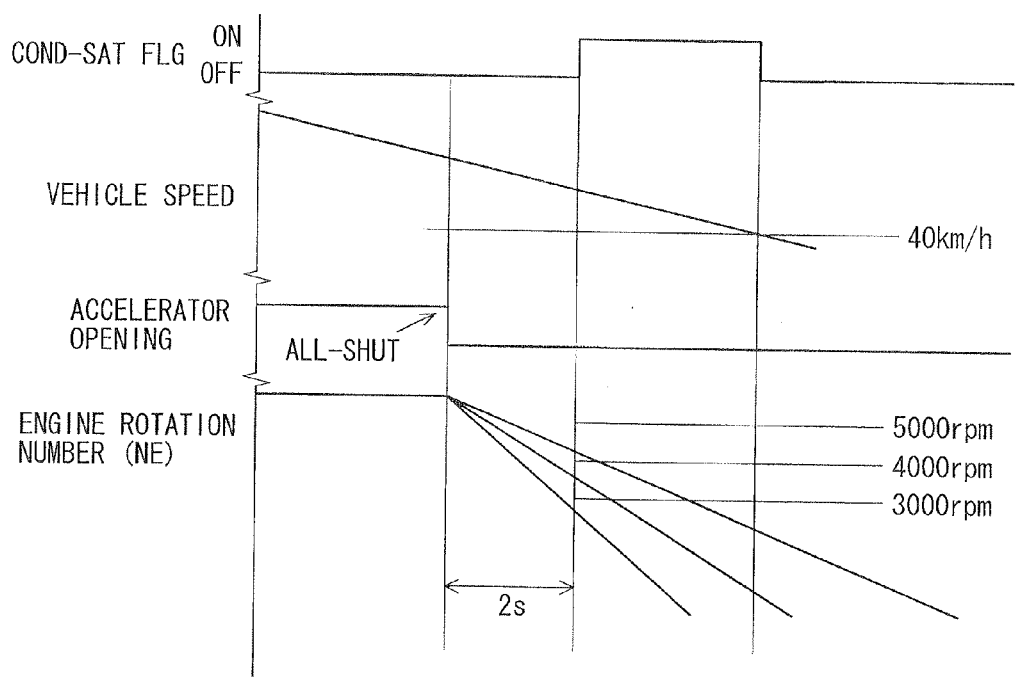
FIG. 4 is a time chart of a condition satisfy flag, a vehicle speed, the engine rotation number in accelerator opening all-shut state of the present disclosure.

When the vehicle speed exceeds 40 km/h in an accelerator opening all-shut state for 2 seconds or longer, the engine rotation number may fall, as shown in FIG. 4, by the use of the engine brake. When the vehicle speed exceeds 40 km/h in an accelerator opening all-shut state for 2 seconds or longer (S410:Yes), ECU 10 continues to S414.

In S414, ECU 10 determines whether a condition satisfy flag is turned on. If the condition satisfy flag is turned on (S414:Yes), ECU 10 determines the condition of S410 is being continuously satisfied, and ECU 10 returns process to S410. In other words, when the condition of S410 is satisfied and ECU 10 performs the increment process (i.e., count-up process) of each of the counters in S416 and subsequent steps once, the condition of S410 will no longer be satisfied, and the increment process of the counters in S416 and subsequent steps will not be performed until the condition satisfy flag will be subsequently turned off in S412.

If the condition satisfy flag is turned off (S414:No), ECU 10 determines that one state of the condition of S410 was not satisfied has transited to the other state that the condition of S410 is now satisfied. Thus, ECU 10 turns on the condition satisfy flag (S416), and stores the engine rotation number (NE in FIGS) (S418), and shifts process to S420.

In S420, if the engine rotation number stored in S418 is less than 5000 rpm and equal to or more than 4000 rpm (S420:Yes), ECU 10 increments (i.e., count-up) each of the counters 32, 34, 36, that is, the less-than-5000 rpm class counter 32 corresponding to the engine rotation number in an accelerator opening all-shut state (i.e. stored in S418), and the less-than-4000 rpm class counter 34 and the less-than-3000 rpm class counter 36 corresponding to classes having lower ranges of engine rotation number (i.e. lower limit class counters)(S422, S424, S426). In other words, ECU 10 increments counters of all classes that correspond to the engine rotation number in an accelerator opening all-shut state and the more-easily-reachable engine rotation numbers, and continues to S428.

If the engine rotation number is not equal to or greater than 4000 rpm and less than 5000 rpm (S420:No), ECU 10 determines whether the engine rotation number is equal to or greater than 3000 rpm and less than 4000 rpm (S432). If the engine rotation number is equal to or greater than 3000 rpm and less than 4000 rpm (S432:Yes), ECU 10 increments each of the less-than-4000 rpm class counter 34 and the less-than-3000 rpm class counter 36 (S434, S436), and continues to S438.

If the engine rotation number is not equal to or greater than 3000 rpm and less than 4000 rpm (S432:No), ECU 10 determines whether the engine rotation number is less than 3000 rpm (S442).

If the engine rotation number is not equal to or greater than 4000 rpm and less than 5000 rpm (S420:No), not equal to or greater than 3000 rpm and less than 4000 rpm (S432:No), and not less than 3000 rpm (S442:No), the engine rotation number is then more than 5000 rpm even after 2 seconds or more in the state that the vehicle speed exceeds 40 km/h in an accelerator opening all-shut state. Since such a travel state of the vehicle is considered as the unexpected driving state, which does not correspond to the driver's driving operation, the drive information corresponding to the vehicle behavior is stored.

Therefore, in the first condition set process of FIG. 3, ECU 10 returns process to S410 without changing the detection condition to be compared with a detected engine rotation number in an accelerator opening all-shut state of S400 of FIG. 2 if a determination of S442 is "No."

If the engine rotation number stored in S418 is less than 3000 rpm (S442:Yes), ECU 10 increments the less-than-3000 rpm class counter 36 (S444), and shifts process to S446.

In S428, ECU 10 determines whether the less-than-5000 rpm class counter 32 exceeds 5. When the less-than-5000 rpm class counter 32 exceeds 5 (S428:Yes), ECU 10 sets the detection condition to be compared with the detected engine rotation number in an accelerator opening all-shut state of FIG. 2 (i.e. the ECU sets the preset engine rotation threshold of of FIG. 2), to have a range of 5000 rpm or more, which is based on a boundary condition between the class of equal-to-or-more-than 4000 rpm to less-than 5000 rpm and a higher limit class of 5000 rpm or more (S430), and continues to S450. It should be understood when the ECU 10 determines whether a counter (i.e. counters 32, 34, 36) is greater than a predetermined threshold (e.g. 5), the ECU 10 compares the value (i.e. count number) of the counter with the predetermined threshold.

When the less-than-5000 rpm class counter 32 is equal to or less than 5 (S428:No), ECU 10 shifts process to S438. In S438, ECU 10 determines whether the less-than-4000 rpm class counter 34 exceeds 5. When the less-than-4000 rpm class counter 34 exceeds 5 (S438:Yes), ECU 10 sets the detection condition to be compared with the detected engine rotation number of FIG. 2 to have a range of 4000 rpm or more, which is based on a boundary condition between (i) the class of equal-to-or-more-than 3000 rpm and less-than 4000 rpm and (ii) the class of equal-to-or-more-than 4000 rpm to less-than 5000 rpm, and continues to S450.

When the less-than-4000 rpm class counter 34 is equal to or less than 5 (S438:No), ECU 10 shifts process to S446. In S446, ECU 10 determines whether the less-than-3000 rpm class counter 36 exceeds 5. When the less-than-3000 rpm class counter 36 exceeds 5 (S446:Yes), ECU 10 sets the detection condition to be compared with the detected engine rotation number of FIG. 2, to have a range of 3000 rpm or more, which is based on a boundary condition between the class of less-than 3000 rpm and the class of equal-to-or-more-than 3000 rpm to less-than 4000 rpm, and continues to S450.

In S450, ECU 10 turns on the detection condition flag, and returns process to S410. The detection condition, which is provided as a predetermined engine rotation range, is used as the preset engine rotation threshold in S400 of FIG. 2. Therefore, with the detection condition flag turned on, when the preset engine rotation threshold is compared with the detected engine rotation number in an accelerator opening all-shut state in S400 of FIG. 2, the drive information is able to be stored when the detected engine rotation number is equal to or greater than the preset engine rotation threshold (i.e. equal to greater than the detection condition) in an accelerator opening all-shut state in S400 of FIG. 2.

When the less-than-3000 rpm class counter 36 is equal to or smaller than 5 (S446:No), all of the counters (i.e. less-than-5000 rpm class counter 32, the less-than-4000 rpm class counter 34, and the less-than-3000 rpm class counter 36) are not equal to or greater than 5, and ECU 10 continues to S410.

(Initialization Process)

Figure 5:
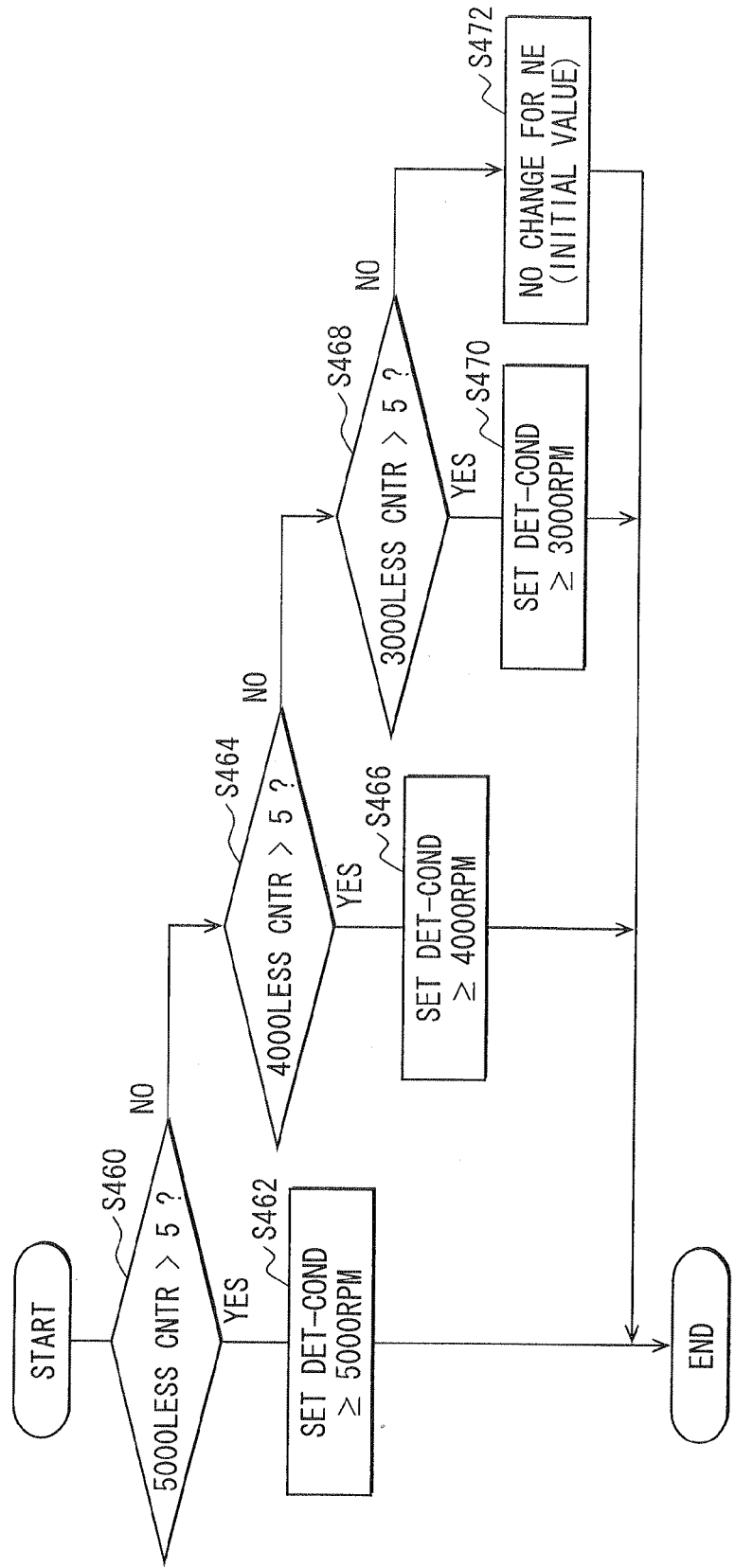
FIG. 5 is a flowchart of a initialization process of the present disclosure.

FIG. 5 is a flowchart of an initialization process for a start time of a drive operation of the vehicle, which sets a range of the engine rotation number to be compared with the detected engine rotation number in an accelerator opening all-shut state in S400 of FIG. 2 based on the value of the counters 32, 34, 36 of EEPROM 30 in the first condition set process. One cycle of the initialization process is performed when a start switch is turned on and the vehicle begins traveling/driving.

When the count number of less-than-5000 rpm class counter 32 exceeds 5 (S460:Yes), ECU 10 sets the detection condition to have a range of equal to or greater than 5000 rpm (S462), and finishes the process. Accordingly, in S400 of FIG. 2, the detection condition of a range equal to or greater than 5000 rpm (i.e. the preset engine rotation threshold) is compared with the detected engine rotation number in an accelerator opening all-shut state to determine whether an unexpected vehicle behavior has occurred.

When the less-than-5000 rpm class counter 32 is equal to or less than 5 (S460:No), ECU 10 determines whether the less-than 4000 rpm class counter 34 exceeds 5 (S464).

When the less-than 4000 rpm class counter 34 exceeds 5 (S464:Yes), ECU 10 sets the detection condition to have a range of equal to or greater than 4000 rpm (466), and finishes the process. Accordingly, in S400 of FIG. 2, the detection condition of a range equal to or greater than 4000 rpm is compared with the detected engine rotation number in S400 of FIG. 2 to determine whether an unexpected vehicle behavior has occurred When the less-than-4000 rpm class counter 34 is equal to or less than 5 (S464:No), ECU 10 determines whether the less-than 3000 rpm class counter 36 exceeds 5 (S468).

When the less-than 3000 rpm class counter 36 exceeds 5 (S468:Yes), ECU 10 sets the detection condition to have a range of equal to or greater than 3000 rpm (S470), and finishes the process. Accordingly, in S400 of FIG. 2, the detection condition of a range equal to or greater than 3000 rpm is compared with the detected engine rotation number in an accelerator opening all-shut state to determine whether an unexpected vehicle behavior has occurred.

When the less-than-3000 rpm class counter 36 is equal to or less than 5 (S468:No), ECU 10 finishes the present process without changing the detection condition to be compared with the detected engine rotation number in an accelerator opening all-shut state in S400 of FIG. 2 (S472). In other words, the detection condition (i.e. preset engine rotation threshold) stays as an initial value.

In summary, the first condition set process of FIG. 3 has three classes of engine rotation numbers in an accelerator opening all-shut state, which respectively serve as the vehicle behavior. The engine rotation number is categorized into class 1 having a rotation number range of equal to or greater than 4000 rpm and less than 5000 rpm, class 2 having a rotation number range of equal to or greater than 3000 rpm and less than 4000 rpm, and class 3 having a rotation number range of less than 3000 rpm.

Based on the counters corresponding to each of three classes, the detection condition, which is provided as a range of predetermined engine rotation number, is set during the drive/travel of the vehicle. The detection condition is compared with the detected engine rotation number in an accelerator opening all-shut state. In such manner, a frequently observed engine rotation number range in an accelerator opening all-shut state, due to the tendency of the engine rotation number increasing during a engine brake operation, can be excluded from the detection condition for storing the drive information.

In such manner, when the engine rotation number increases, such increase of the engine rotation number in an accelerator opening all-shut state, which is not caused by an engine brake operation, is determined as an unexpected vehicle behavior and corresponding drive information may be stored in the EEPROM 30. Thus, drive information stored in EEPROM 30 may be analyzed to determine a cause of the unexpected increase of the engine rotation number in an accelerator opening all-shut state.

Further, in the first condition set process in FIG. 3, the counter of a class that is determined to correspond to the engine rotation number in an accelerator opening all-shut state and the counter of a class corresponding to a lower engine rotation number range that is more-easily-reachable (i.e. a lower limit class) are increased, as the observation of the vehicle behavior. That is, in an accelerator opening all-shut state, by incrementing the counter of not only the class of an actually-detected engine rotation number range but also the counter of the lower limit class, the counter of each of those classes is easily increased. As a result, based on the count number of the counter of each of the classes, the frequency of changing the detection condition is increased.

Further, in the initialization process in FIG. 5, the values of the less-than-5000/4000/3000 rpm class counters 32, 34, 36 for the previous trip, which is defined as a trip of a vehicle between the start of the vehicle operation and the end of the vehicle operation, are read from EEPROM 30, and those values are used to set the predetermined engine rotation range (i.e. the detection condition) to be compared with the detected engine rotation number in an accelerator opening all-shut state in S400 of FIG. 2. Therefore, based on the tendency of the engine rotation number of a vehicle driver who uses engine brakes in an accelerator opening all-shut state inherited from the previous trip, the detection condition for a current trip is set at the beginning (i.e. initialization process) of the current trip of the vehicle.

In FIG. 1, ECU 10 is equivalent to an electric control unit of the present disclosure, and EEPROM 30 is equivalent to the memory unit of the present disclosure.

Further, in the first drive information store process of FIG. 2, a process to determine whether a detected engine rotation number in an accelerator opening all-shut state is greater than a preset engine rotation threshold in S400 is equivalent to a function that is performed by a behavior check unit of the present disclosure, and a process for storing the drive information, such as the accelerator opening, the engine rotation number, the vehicle speed, the intake air amount, the temperature of intake air, the water temperature, the throttle opening in EEPROM 30 in S402 is equivalent to a function that is performed by a drive information store unit of the present disclosure.

Further, in first condition set process in FIG. 3, a process of S420, S432, S442 is equivalent to a function that is performed by a classify unit of the present disclosure, and a process of S422 to S426, S434, S436, S444 is equivalent to a function that is performed by a count unit of the present disclosure, and a process of S428, S430, S438, S440, S446, S448 is equivalent to a function that is performed by a condition set unit of the present disclosure.

Further, a process of S460 to S472 in FIG. 5 is equivalent to a function that is performed by a condition set unit of the present disclosure.

(Second Condition Set Process)

Figure 6:
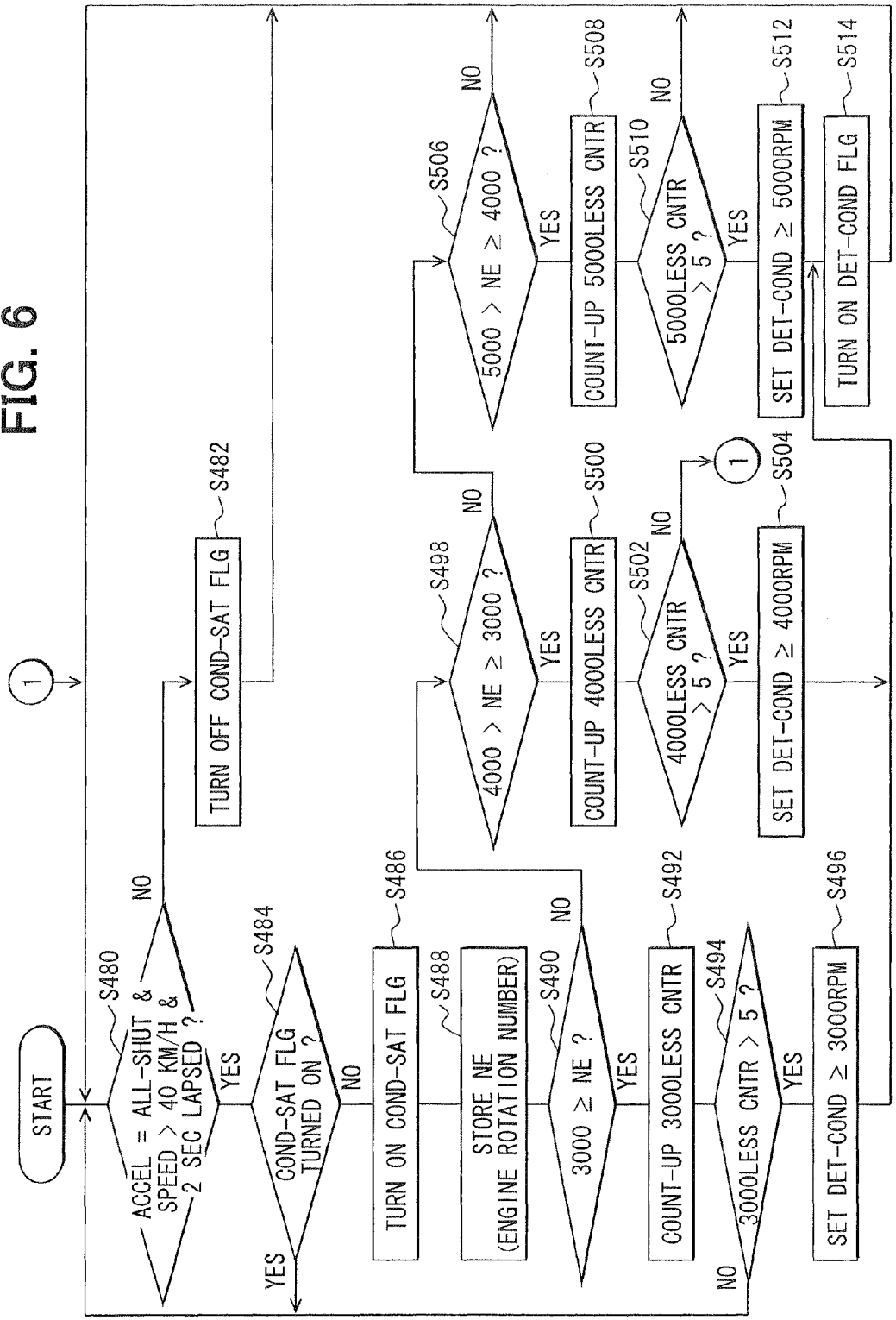
FIG. 6 is a flowchart of a second condition set process based on the engine rotation number of the present disclosure.

FIG. 6 shows a flowchart of a second condition set process, which is different from the first condition set process in FIG. 3, where the second condition set process would be performed instead of the first condition set process. The second condition set process is continuously performed.

The process of S480 to S488 in FIG. 6 is substantially same as the process of S410 to S418 in FIG. 3.

In S490, ECU 10 determines whether the engine rotation number stored in S488 is less than 3000 rpm. If the engine rotation number is equal to or greater than 3000 rpm (S490: No), ECU 10 continues to S498.

If the engine rotation number is less than 3000 rpm (S490: Yes), ECU 10 increments only the less-than 3000 rpm class counter 36 corresponding to a class less than 3000 rpm (S492), and continues to S494.

In S498, ECU 10 determines whether the engine rotation number is equal to or greater than 3000 rpm and less than 4000 rpm. If the engine rotation number is less than 4000 rpm and equal to or greater than 3000 rpm (S498:Yes), ECU 10 increments only the less than 4000 rpm class counter 34 corresponding to a class less than 4000 rpm and equal to or greater than 3000 rpm (S500), and continues to S502.

If the engine rotation number is not less than 4000 rpm and equal to or greater than 3000 rpm (S498:No), ECU 10 determines whether the engine rotation number is equal to or greater than 4000 rpm and less than 5000 rpm (S506).

If the engine rotation number is not less than 3000 rpm (S490:No), is not less than 4000 rpm and equal to or greater than 3000 rpm (S498:No), and is not less than 5000 rpm and equal to or greater than 4000 rpm (S506:No), that indicates that the engine rotation number stored in S488 is equal to or greater than 5000 rpm even after a lapse of 2 seconds of a condition that the vehicle speed exceeds 40 km/h in accelerator opening all-shut state.

Since such vehicle behavior is considered as an unexpected drive condition that does not correspond the driver's driving operation, the drive information regarding such condition is an indicator of a vehicle behavior which is desirably stored for later analysis.

Therefore, if a determination in S506 is "No," ECU 10 returns process to S480 without changing the detection condition in the second condition set process in FIG. 6, that is, the detection condition to be compared with the engine rotation number in an accelerator opening all-shut state (i.e. the preset engine rotation threshold) in S400 of FIG. 2 is not changed.

If the engine rotation number is less than 5000 rpm and equal to or greater than 4000 rpm (S506:Yes), ECU 10 increments only the less-than-5000 rpm class counter 32 corresponding to a class less than 5000 rpm and equal to or greater than 4000 rpm (S508), and continues to S510.

In S494, ECU 10 determines whether the less-than 3000 rpm class counter 36 exceeds 5. When the less-than 3000 rpm class counter 36 exceeds 5 (S494:Yes), ECU 10 sets the detection condition to an engine rotation number of equal to or more than 3000 rpm, which is a boundary condition between (i) the class of less than 3000 rpm and (ii) the next class, that is, a more-difficult-to-reach engine rotation number class (i.e. a higher limit class) of equal to or greater than 3000 rpm and less than 4000 rpm in an accelerator opening all-shut state (S496), and continues to S514. The detection condition provided as a predetermined engine rotation range is used as the preset engine rotation threshold, and is compared with the detected engine rotation number in an accelerator opening all-shut state in S400 of FIG. 2.

In S502, ECU 10 determines whether the less-than 4000 rpm class counter 34 exceeds 5. When the less-than 4000 rpm class counter 34 exceeds 5 (S502:Yes), ECU 10 sets the detection condition to an engine rotation number of equal to or greater than 4000 rpm, which is a boundary condition between (i) the class of equal to or greater than 3000 rpm and less than 4000 rpm and (ii) a higher limit class of equal to or greater than 4000 rpm and less than 5000 rpm in an accelerator opening all-shut state (S504), and shifts process to S514. The detection condition provided is used as the preset engine rotation threshold, and is compared with the detected engine rotation number in an accelerator opening all-shut state in S400 of FIG. 2

In S510, ECU 10 determines whether the less-than-5000 rpm class counter 32 exceeds 5. When the less-than-5000 rpm class counter 32 exceeds 5 (S510:Yes), ECU 10 sets the detection condition to an engine rotation number of equal to or greater than 5000 rpm, which is a boundary condition between (i) the class equal to or greater than 4000 rpm and less than 5000 rpm and (ii) a higher limit class of more than 5000 rpm in an accelerator opening all-shut state (S512), and continues to S514. The detection condition provided is used as the preset engine rotation threshold, and is compared with the detected engine rotation number in an accelerator opening all-shut state in S400 of FIG. 2

In S514, ECU 10 turns on the detection condition flag, and returns process to S480. When the predetermined engine rotation range (i.e. the detection condition) is set in one of S496, S504 or S512, the detection condition flag is turned on in S514, thereby allowing, in S400 of FIG. 2, the storage of the drive information at a time when the detected engine rotation number is equal to or greater than the preset engine rotation threshold (i.e. the detection condition) in an accelerator opening all-shut state.

The detection condition set by the second condition set process of FIG. 6 is set as the detection condition of the vehicle drive start time by the initialization process shown in FIG. 5.

Figures 7A, 7B, 9:
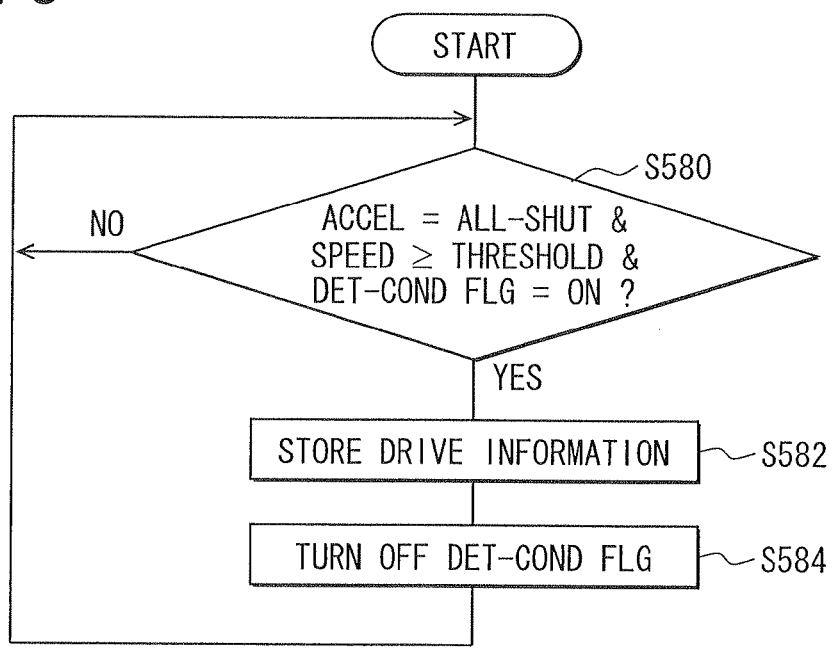
FIGS. 7A and 7B are illustrations comparing the first condition set process of FIG. 3 and the second condition set process of FIG. 6.
FIG. 9 is a flowchart of a second drive information memory process based on vehicle speed of the present disclosure.

With reference to FIGS. 7A and 7B, as way of example, in the first condition set process of FIG. 3, when the following vehicle behavior has occurred six times, where 2 seconds have lapsed in a condition that the vehicle speed exceeds 40 km/h in an accelerator opening all-shut state, and when, among six times of such vehicle behavior, an S432-Yes determination is three times and an S442-Yes determination is three times, the less-than-4000 rpm class counter 34 becomes 3 and the less-than-3000 rpm class counter 36 becomes 6. As a result, the detection condition (i.e. the preset engine rotation threshold) to be compared with the detected engine rotation number in S400 of FIG. 2 is set to be equal to or more than 3000 rpm in S400.

In contrast, in the second condition set process in FIG. 6, when the following vehicle behavior has occurred six times, where 2 seconds have lapsed in a condition that the vehicle speed exceeds 40 km/h in an accelerator opening all-shut state, and when, among six times of such vehicle behavior, an S490-Yes determination is three times and an S498-Yes determination is three times, the less-than-4000 rpm class counter 34 becomes 3 and the less-than-3000 rpm class counter 36 becomes 3 (FIG. 7B). Having such count number of the counters, the detection condition (i.e. the preset engine rotation threshold) to be compared with the detected engine rotation number in S400 of FIG. 2 will not be changed.

In other words, when a vehicle behavior that corresponds to a class of equal to or greater than 3000 rpm and less than 4000 rpm occurs three times, and a vehicle behavior that corresponds to a class of under 3000 rpm occurs three times in an accelerator opening all-shut state, the detection condition to be compared with the detected engine rotation number in an accelerator opening all-shut state in S400 is changed in the first condition set process, but is not changed in the second condition set process.

Since, only the counter for a class that corresponds to the engine rotation number in an accelerator opening all-shut state in the second condition set process is incremented, the frequency to change the detection condition is decreased in comparison to the first condition set process. On the other hand, since the driver's driving operation tendency to use engine brakes is reflected in the count number of the counter of each class, the detection condition is set to be appropriately reflecting the driver's driving operation tendency based on the count number of the counter of each class.

In the second condition set process in FIG. 6, a process of S490, S498, S506 is equivalent to a function that is performed by a classify unit of the present disclosure, and a process of S492, S500, S508 is equivalent to a function that is performed by a count unit of the present disclosure, and a process of S494, S496, S502, S504, S510, S512 is equivalent to a function that is performed by a condition set unit of the present disclosure.

Accordingly, based on the second condition set process, the count unit only increments the counter of the behavior class into which the currently-generated vehicle behavior is classified by the classify unit. In such manner, the actually-generated vehicle behavior is exclusively counted, thereby enabling an appropriate setting of the detection condition based on a correctly-counted counter of the vehicle behaviors.

In addition, based on the first condition set process, the count unit increments (i) the counter of the behavior class into which the vehicle behavior is classified by the classify unit and (ii) the counter of at least one other behavior class whose vehicle behavior is more easily generable (i.e. a lower limit behavior class) than the behavior class. In such manner, by increasing the counter of one behavior class together with at least one lower limit behavior class the increase of the overall count is accelerated. Therefore, a time to set or change a detection condition based on the counter of respective behavior class is decreased.

(Third Condition Set Process)

Figure 8:
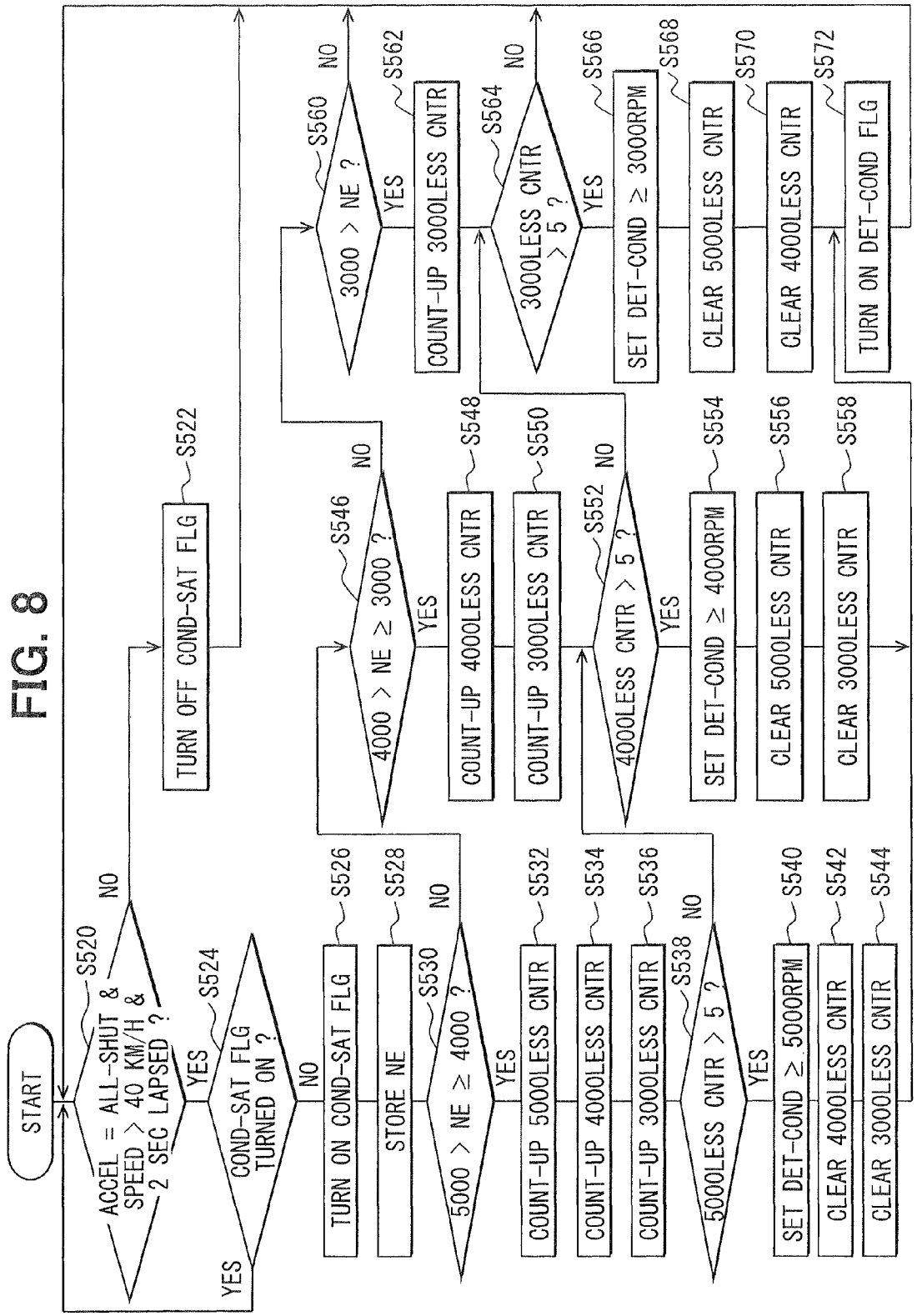
FIG. 8 is a flowchart of a third condition set process based on the engine rotation number of the present disclosure.

FIG. 8 shows a flowchart of a third condition set process, which is different from the first and the second condition set processes, where the third condition set process would be performed instead of the first or the second condition set processes. The third condition set process is continuously performed.

The process of S520 to S540 of FIG. 8 is substantially same as the process of S410 to S430 of FIG. 3, and, the process of S546 to S554 of FIG. 8 is substantially same as the process of S432 to S440 of FIG. 3. Further, the process of S560 to S566 of FIG. 8 is substantially same as the process of S442 to S448 of FIG. 3.

In the third condition set process of FIG. 8, when the less-than-5000 rpm class counter 32 exceeds 5 (S538:Yes) and when the detection condition, which is compared to the detected engine rotation number in S400 of FIG. 2, is set to be equal to or greater than 5000 rpm (S540), the process clears the less-than-4000 rpm class counter 34 and the less-than-3000 rpm class counter 36 (S542, S544).

Further, when the less-than-4000 rpm class counter 34 exceeds 5 (S552:Yes) and when the detection condition, which is compared with the detected engine rotation number in S400 of FIG. 2, is set to be equal to or greater than 4000 rpm (S554), the process clears the less-than-5000 rpm class counter 32 and the less-than-3000 rpm class counter 36 (S556, S558).

Further, when the less-than 3000 rpm class counter 36 exceeds 5 (S564: Yes) and when the detection condition, which is compared with the detected engine rotation number in S400 of FIG. 2, is set to be equal to or greater than 3000 rpm (S566), the process clears the less-than-5000 rpm class counter 32 and the less-than-5000 rpm class counter 34 (S568, S570).

In S572, ECU 10 turns on the detection condition flag, and returns process to S520. When the predetermined engine rotation range (i.e. the detection condition) is set in one of S540, S554 or S566, the detection condition flag is turned on in S514, thereby allowing, in S400 of FIG. 2, the storage of the drive information at a time when the detected engine rotation number is equal to or greater than the preset engine rotation threshold (i.e. the detection condition) in an accelerator opening all-shut state.

The detection condition set by the third condition set process of FIG. 8 is used as the detection condition of the vehicle drive start time by the initialization process shown of FIG. 5.

In the third condition set process of FIG. 8, when the count number of a certain counter exceeds a predetermined threshold, other counters are cleared to start the count from the initial state. As a result, a frequent change of the detection condition is prevented, and a use time of a certain detection condition which is compared with the engine rotation number in an accelerator opening all-shut state is extended.

In the third condition set process of FIG. 8, a process of S530, S546, S560 is equivalent to a function that is performed by a classify unit of the present disclosure, and a process of S532 to S536, S542, S544, S548, S550, S556, S558, S562, S568, S570 is equivalent to a function that is performed by a count unit of the present disclosure, and a process of S538, S540, S552, S554, S564, S566 is equivalent to a function that is performed by a condition set unit of the present disclosure.

Based on the configuration of the third condition set process, when the condition set unit sets the detection condition upon detecting that at least one of the plurality of behavior classes has the over-threshold count, the count unit initializes the counter of all behavior classes except the behavior class having the over-threshold count.

In such manner, the counter of all behavior classes except the one having the over-threshold count are initialized, thereby increasing a time for the initialized behavior classes to exceed the threshold count. Thus, frequent changing of the detection condition is prevented, thereby allowing a continuation of use of a certain detection condition for a certain period of time. That is, a use time of the certain detection condition is extended.

Based on the first, second, and third condition set process, when a driver of the vehicle frequently uses engine brakes while the vehicle is traveling, the engine rotation number in the accelerator opening all-shut state easily rises. Therefore, when the detection condition is set as a condition that the engine rotation number in the accelerator opening all-shut state is above a predetermined engine rotation range and such detection condition is fixedly used, the detected engine rotation number satisfying the detection condition may easily be generated corresponding to the driver's driving operation (i.e., use of engine brakes), thereby leading to the repeated storage of the drive information of such corresponding vehicle behavior.

As a result, the drive information stored in the memory unit due to the over-threshold rise of the engine rotation number in spite of no use of engine brakes in an accelerator opening all-shut state, which is considered as the non-corresponding (i.e., unexpected and possibly abnormal) vehicle behavior, may be overwritten by other drive information due to the increase in the engine rotation number by the frequent use of engine brakes, which falsely satisfy the detection condition of an unexpected vehicle behavior.

Therefore, the engine rotation number in an accelerator opening all-shut state is used as the vehicle behavior, and a certain range of the engine rotation number is used as the detection condition.

In such manner, when a driver frequently uses engine brakes in an accelerator opening all-shut state, such a frequent use of engine brakes is counted as an increased count of a certain behavior class corresponding to the engine rotation number. Therefore, based on the counter of each of the plurality of behavior classes, the engine rotation number frequently detected in an accelerator opening all-shut state may be rendered not to satisfy the detection condition, by appropriately setting/changing a range of the engine rotation number to one of the many boundary conditions between behavior classes.

In such manner, even when the engine rotation number has risen to the value corresponding to the driver's driving operation of frequently-used engine brakes in an accelerator opening all-shut state, storage of the drive information of the vehicle at such time is prevented, thereby enabling the storage of only the drive information about a vehicle behavior such as an unexpected increase of the engine rotation number not corresponding to the driver's driving operation in an accelerator opening all-shut state.

(Second Drive Information Store Process)

Figure 10:
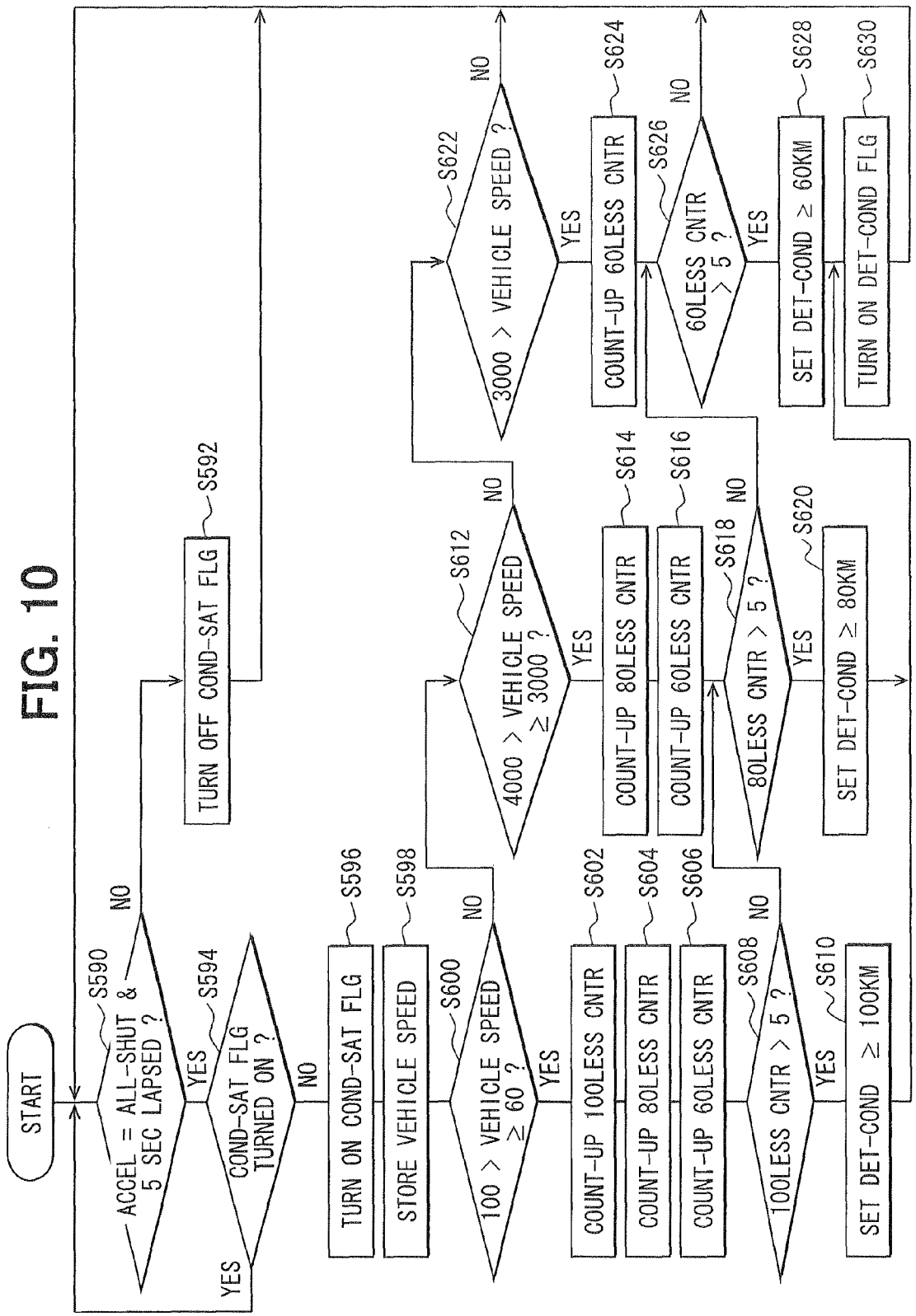
FIG. 10 is a flowchart of a fourth condition set process based on vehicle speed in the embodiment of the present disclosure.

FIG. 9 shows a flowchart of a second drive information store process, which sets the range of the vehicle speed to be compared with the vehicle speed in an accelerator opening all-shut state, instead of setting the range of the engine rotation number, as a part of the detection condition for storing the drive information. Further, FIG. 10 shows a flowchart of a fourth condition set process, which sets, in the second drive information store process of FIG. 9, the range of the vehicle speed to be compared with the vehicle speed in an accelerator opening all-shut state. The second drive information store process of FIG. 9 and the condition setting process 4 of FIG. 10 are continuously performed.

In the flowchart of FIG. 9, ECU 10, in S580, determines whether an accelerator opening is in the all-shut state, and whether the vehicle speed is higher than a predetermined speed, and whether the detection condition flag is turned on. The initial value of the predetermined speed maybe set to 40 km/h. Further, the initial value of the detection condition flag is set to "on".

When the accelerator opening is not in the all-shut state, or when the vehicle speed is not higher than the predetermined speed, or when the detection condition flag is in the "off" state (S580:No), ECU 10 continues the determination process of S580.

If the accelerator opening is in the all-shut state, and the vehicle speed is higher than the predetermined speed, and the detection condition flag is turned on (S580:Yes), ECU 10 acquires the drive information such as an accelerator opening, an engine rotation number, a vehicle speed, an intake air amount, temperature of intake air, water temperature, a throttle opening and the like, and stores the drive information in EEPROM 30 (S582). The detection condition flag is then set to the "off" state (S584), and ECU 10 returns process to S580. Therefore, until the detection condition flag is subsequently turned on, the process for storing the drive information in S582 will not be performed even when the accelerator opening is in the all-shut state, and the vehicle speed is equal to or greater than a predetermined speed.

(Fourth Condition Set Process)

In a charted process of FIG. 10, ECU 10 determines whether the accelerator opening in an all-shut state is kept for 5 seconds or more (S590).

When the accelerator opening is not an all-shut state, or when the all-shut state of the accelerator opening has not been kept for five seconds or more (S590:No), the condition satisfy flag is turned off (S592), and ECU 10 returns process to S590.

The reason for including the lapse of 5 seconds in the above condition is to prevent a false detection and determination. That is, if the above-described 5 second condition is not required, the other condition (i.e., an accelerator opening all-shut state) of S590 may be easily satisfied when the engine rotation number is high at the beginning of engine brakes, thereby allowing the range of the vehicle speed to be compared with the vehicle speed in an accelerator opening all-shut state, which serves as the detection condition in S580 of FIG. 9, to have a high speed value. After lapse of 5 seconds in an accelerator opening all-shut state, the vehicle speed is expected to fall down.

When the accelerator opening all-shut state is kept for 5 seconds or more (S590:Yes), ECU 10 determines that engine brakes are used during a travel of the vehicle and the vehicle speed should have fallen down, and shifts process to S594.

In S594, ECU 10 determines whether the condition satisfy flag is turned on. If the condition satisfy flag is turned on (S594:Yes), ECU 10 determines that a S590-Yes condition is kept unchanged, and ECU 10 returns process to S590. In other words, when a condition of S590 is being satisfied and ECU 10 performs a count up process of incrementing counters in S596 and in subsequent steps for one cycle, the condition of S590 will not be satisfied any more, and the count up process of counters after S596 will not be performed until the condition satisfy flag is subsequently turned off in S592.

If the condition satisfy flag is turned off (S594:No), ECU 10 determines that the conditions in S590 have shifted from a non-satisfied state to a satisfied state, and turns on the condition satisfy flag (S596), and stores the vehicle speed (S598), and shifts process to S600.

In FIG. 10, a process after S600 is substantially same as a process in FIG. 3, in which the engine rotation number (NE in FIGs) is replaced with the vehicle speed, 5000 rpm is replaced with 100 km/h, 4000 rpm is replaced with 80 km/h, 3000 rpm is replaced with 60 km/h. Thus, explanation of S600 and subsequent steps is saved for the sake of brevity.

The detection condition set by the fourth condition set process of FIG. 10 is used as the detection condition of the vehicle drive start time by the initialization process as shown in a flowchart of FIG. 5, in which the engine rotation number (NE in FIGs) is replaced with the vehicle speed, 5000 rpm is replaced with 100 km/h, 4000 rpm is replaced with 80 km/h, and 3000 rpm is replaced with 60 km/h.

Further, an under 100 km/class counter, an under 80 km/h class counter, an under 60 km/h class counter used by the fourth condition set process of FIG. 10 are set in EEPROM 30, just like the less-than-5000 rpm class counter 32, the less-than-4000 rpm class counter 34, and the less-than-3000 rpm class counter 36.

In the fourth condition set process of FIG. 10, the range of the vehicle speed used as a detection condition to be compared with the vehicle speed in an accelerator opening all-shut state is set during the driving of the vehicle based on the counter corresponding to each class as mentioned above. Therefore, the range of the vehicle speed in an accelerator opening all-shut state, which may be frequently generated due to the tendency of the driver's driving operation for using engine brakes, is excluded from the detection condition for storing the drive information.

Therefore, the increase of the vehicle speed in an accelerator opening all-shut state, which is not generated by the tendency of the driver's driving operation for using engine brakes, but is generated in a non-corresponding manner to the driver's driving operation, is stored in EEPROM 30 as the drive information. As a result, based on the drive information stored in EEPROM 30, a cause of such an increase of vehicle speed to an unexpected level in an accelerator opening all-shut state is analyzed and determined.

In the second drive information store process of FIG. 9, a process of S580 is equivalent to a function that is performed by a behavior check unit of the present disclosure, and a process of S582 is equivalent to a function that is performed by a drive information store unit of the present disclosure.

Further, in the fourth condition set process of FIG. 10, a process of S600, S612, S622 is equivalent to a function that is performed by a classify unit of the present disclosure, and a process of S602 to S606, S614, S616, S624 is equivalent to a function that is performed by a count unit of the present disclosure, and a process of S608, S610, S618, S620, S626, S628 is equivalent to a function that is performed by a condition set unit of the present disclosure.

Other Embodiments

In the above embodiment, one of the engine rotation number or the vehicle speed in an accelerator opening all-shut state is used as the vehicle behavior to be compared with a detection condition, and, when the vehicle behavior is determined to satisfy the detection condition, it is determined that the vehicle behavior is being generated in a manner that does not correspond to the driver's driving operation, and the drive information at such time is stored in EEPROM 30. However, besides the engine rotation number or the vehicle speed in an accelerator opening all-shut state, any vehicle behavior may be compared with a detection condition, as long as the vehicle behavior is observed in a manner that does not correspond to the driver's driving operation.

Further, EEPROM used as a memory unit for storing the drive information when an unexpected vehicle behavior satisfying a detection condition is generated may not only be EEPROM in a subject ECU but an EEPROM in other ECUs.

Further, a memory unit for storing the drive information of the vehicle when an unexpected vehicle behavior is generated may not only be EEPROM 30 but any information storage that retains data during an operation stop time of the vehicle, such as SRAM 26.

In the above embodiment, the same detection condition of the vehicle behavior, such as the engine rotation number or the vehicle speed in an accelerator opening all-shut state, is stored and used (i.e., is inherited) for many trips of the vehicle, by using a less-than-5000 rpm class counter 32, a less-than-4000 rpm class counter 34, a less-than-3000 rpm class counter 36, or by using a less-than-100 km class counter, a less-than-80 km class counter, a less-than-60 km class counter in EEPROM 30. That is, the tendency of the vehicle behavior corresponding to the driver's driving operation is inherited over time.

However, when a driver of a vehicle is frequently changed, the tendency of a driver's driving operation is preferably learned for each driver. Therefore, without changing the drive information store process, the condition set process, or the initialization process, all of which uses the engine rotation number or the vehicle speed as a part of the detection condition for storing the drive information, the less-than-5000 rpm class counter 32, the less-than-4000 rpm class counter 34, the less-than-3000 rpm class counter 36, or the less-than-100 km class counter, the less-than-80 km class counter, the less-than-60 km class counter may be set in RAM 24.

In such manner, the detection condition is learned for each of driver by initializing each counter whenever a start switch is turned on and the driving of the vehicle is started and by initializing the detection condition in the initialization process. That is, the detection condition is learned afresh whenever the driver is changed.

The present disclosure is applicable to an engine-driven vehicle, such as a gasoline engine vehicle, a diesel engine vehicle or the like. Further, it is applicable to a hybrid vehicle which uses both of an internal combustion engine and an electric motor. Further, it is applicable to an electric vehicle when the detection condition is based on the vehicle speed as shown in FIGS. 9 and 10.

Although the present disclosure has been fully described with reference to the accompanying drawings, it is to be noted that various changes and modifications will become apparent to those skilled in the art. Further, such changes, modifications, and summarized schemes are to be understood as being within the scope of the present disclosure as defined by appended claims.

What is claimed is:

1. An electric control unit comprising:
 a behavior check unit determining whether a vehicle behavior is generated by comparing the vehicle behavior with a detection condition;
 a drive information store unit storing information of the vehicle behavior in a memory unit drive when behavior check unit determines that the vehicle behavior is generated;
 a classify unit classifying the vehicle behavior into one of plurality of predetermined behavior classes, the plurality of predetermined behavior classes being arranged to classify the vehicle behavior according to a magnitude of the vehicle behavior;
 a count unit controlling a counter for each of the plurality of behavior classes according to classification of the vehicle behavior by the classify unit; and
 a condition set unit setting the detection condition as a boundary condition of one of the plurality of behavior classes based on the counter of each of the plurality of behavior classes.

2. The electric control unit of claim 1, wherein the condition set unit sets the detection condition as the boundary condition between a base behavior class that has an over-threshold count of the vehicle behavior and a higher limit behavior class next to the base behavior class, the vehicle behavior in the higher behavior class being less easily generable than the vehicle behavior of the base behavior class.

3. The electric control unit of claim 1, wherein the count unit only increments the counter of the behavior class into which the vehicle behavior is classified by the classify unit.

4. The electric control unit of claim 1, wherein the count unit increments the counter of the behavior class into which the vehicle behavior is classified by the classify unit and the counter of at least one other behavior class that is a lower limit behavior class.

5. The electric control unit of claim 1, wherein when the condition set unit sets the detection condition upon detecting that at least one of the plurality of behavior classes has the over-threshold count, the count unit initializes the counter of all the behavior classes except the behavior class having the over-threshold count.

6. The electric control unit of claim 1, wherein the count unit stores the counter of each behavior class in a rewritable memory unit that retains data while a vehicle driving operation is stopped.

7. The electric control unit of claim 1, wherein the count unit stores the counter of each behavior class in a rewritable memory unit that discards data when a vehicle driving operation is stopped.

8. The electric control unit of claim 1, wherein
the vehicle behavior is an engine rotation number in an accelerator opening all-shut state, and
the detection condition is a range of the engine rotation number.

* * * * *